United States Patent [19]
Mori et al.

[11] Patent Number: 4,991,174
[45] Date of Patent: Feb. 5, 1991

[54] FAULT DIAGNOSTIC DISTRIBUTED PROCESSING METHOD AND SYSTEM

[75] Inventors: Kinji Mori, Yokohama; Shoji Miyamoto, Kawasaki; Takeshi Shiraha, Nishinomiya, all of Japan

[73] Assignee: Hitachi, Ltd., Tokyo, Japan

[21] Appl. No.: 329,558

[22] Filed: Mar. 28, 1989

Related U.S. Application Data

[63] Continuation of Ser. No. 938,442, Dec. 5, 1986, which is a continuation of Ser. No. 569,903, Jan. 11, 1984, abandoned.

[30] Foreign Application Priority Data

Sep. 8, 1983 [JP] Japan .................. 58-165994

[51] Int. Cl.$^5$ ............................. G06F 11/00
[52] U.S. Cl. .................. 371/15.1; 371/16.1; 371/7; 371/11.3; 371/9.1
[58] Field of Search ............ 371/15, 5, 16, 7, 11, 371/8, 13, 22, 2, 9, 34, 38, 8.1, 8.2, 9.1, 11.1, 11.2, 11.3, 15.1, 16.1; 364/200, 900

[56] References Cited

U.S. PATENT DOCUMENTS

| | | | |
|---|---|---|---|
| 3,916,177 | 10/1973 | Greenwald | 371/16.1 |
| 4,320,508 | 3/1982 | Takezoo | 371/11 |
| 4,354,267 | 10/1982 | Mori | 371/11 |
| 4,371,952 | 2/1983 | Schuch | 371/16 |
| 4,374,436 | 2/1983 | Armstrong | 371/11 |
| 4,387,426 | 6/1983 | Roberts | 371/11.3 |
| 4,392,199 | 7/1983 | Schmitter | 371/11 |
| 4,412,281 | 10/1983 | Works | 371/9.1 |
| 4,438,494 | 3/1984 | Budde | 371/11 |
| 4,468,738 | 8/1984 | Hansen | 371/11.3 |
| 4,498,082 | 2/1985 | Aldridge | 371/11 |
| 4,503,534 | 3/1985 | Budde | 371/11 |
| 4,503,535 | 3/1985 | Budde | 371/11 |
| 4,511,958 | 4/1985 | Funk | 371/11 |
| 4,527,270 | 7/1985 | Sweeton | 371/11 |
| 4,590,554 | 5/1986 | Glazier | 371/11.3 |
| 4,627,055 | 12/1986 | Mori | 377/11.3 |
| 4,637,019 | 1/1987 | Rahimzad | 371/16.1 |
| 4,729,124 | 3/1988 | Hansel | 371/18 |
| 4,740,887 | 4/1988 | Rutenberg | 371/11.3 |

Primary Examiner—Michael R. Fleming
Attorney, Agent, or Firm—Antonelli, Terry, Stout & Kraus

[57] ABSTRACT

In a distributed processing system having a plurality of interconnected subsystems of equal level, each subsystem operates to diagnose faults in other subsystems and protects its own subsystem based on the diagnosis of the faults of the other subsystems. The subsystems may be network control processors connected to common signal transmission lines, each of which carries major and minor loop check messages used to detect the faults in the other network control processors and constitutes a bypass route to protect its own unit when the fault occurs. If a transient fault occurs in the systems, an indication of the degree of the transient fault is stored and a possibility that the transient fault will change to a permanent fault is determined based on a time variation of the degree of the fault. If it is determined that the transient fault will change to a permanent fault, it is indicated to a man-machine system. In this manner, a loop transmission system which can be readily prediction-diagnosed for a fault is provided. In a second embodiment, means for calculating a feedback rate of a signal sent out to the transmission line and means for calculating the degree of fault on the transmission line based on the feedback rate calculated by the calculation means are provided.

22 Claims, 21 Drawing Sheets

FIG. 1
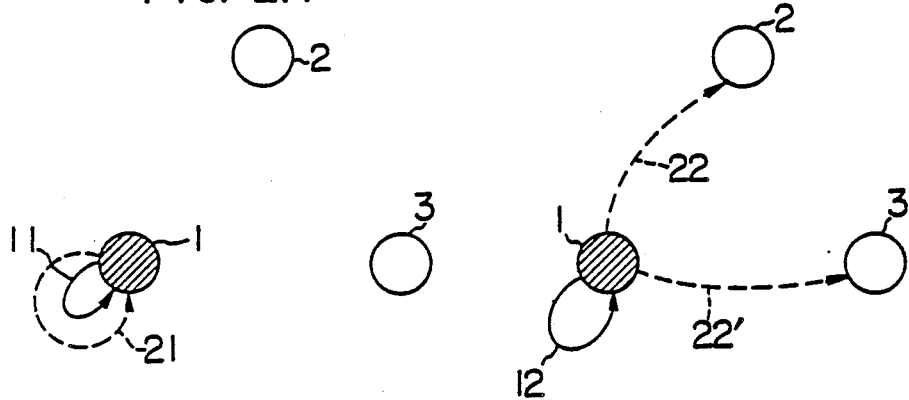
FIG. 2A
FIG. 2B
FIG. 2C
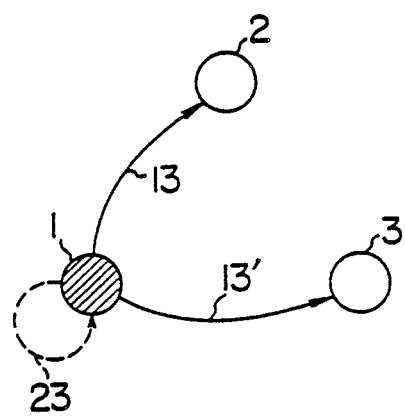
FIG. 2D
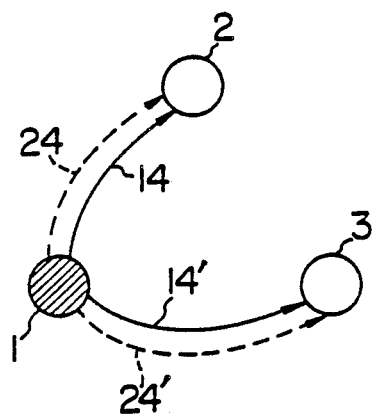

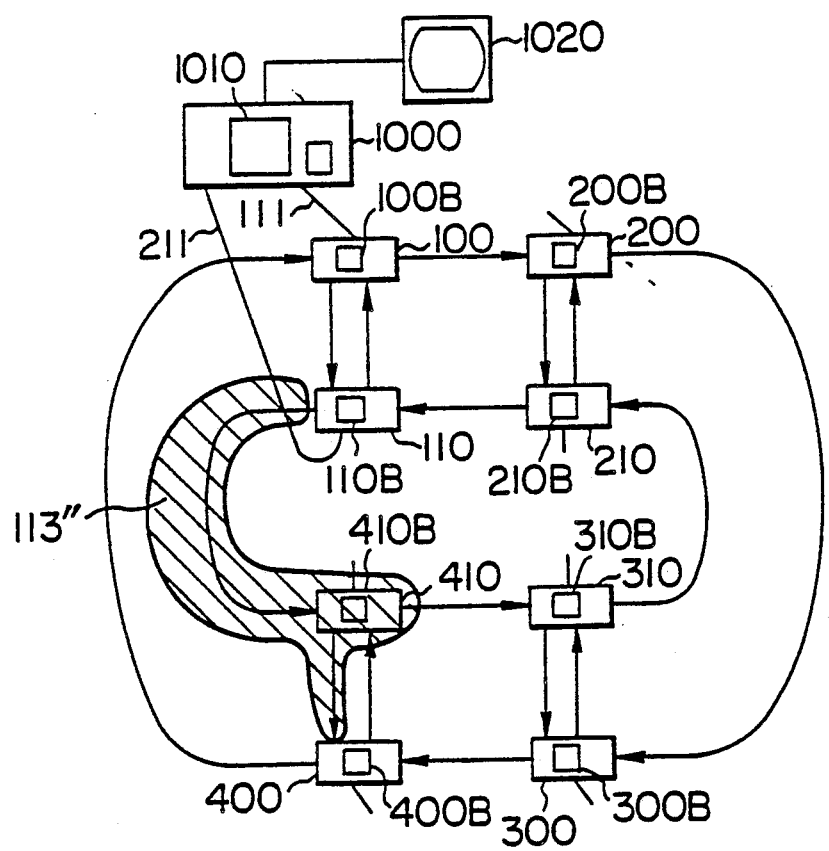

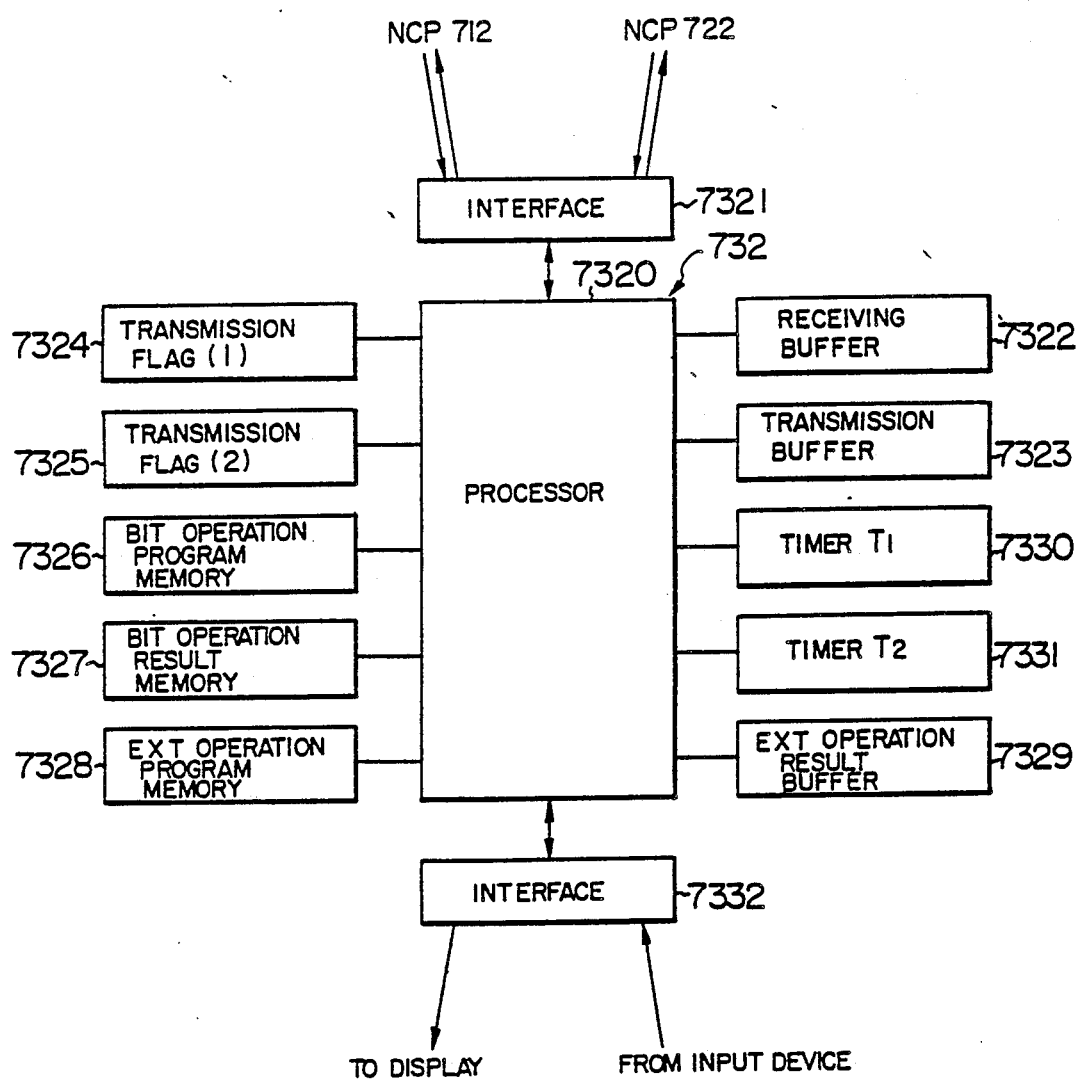

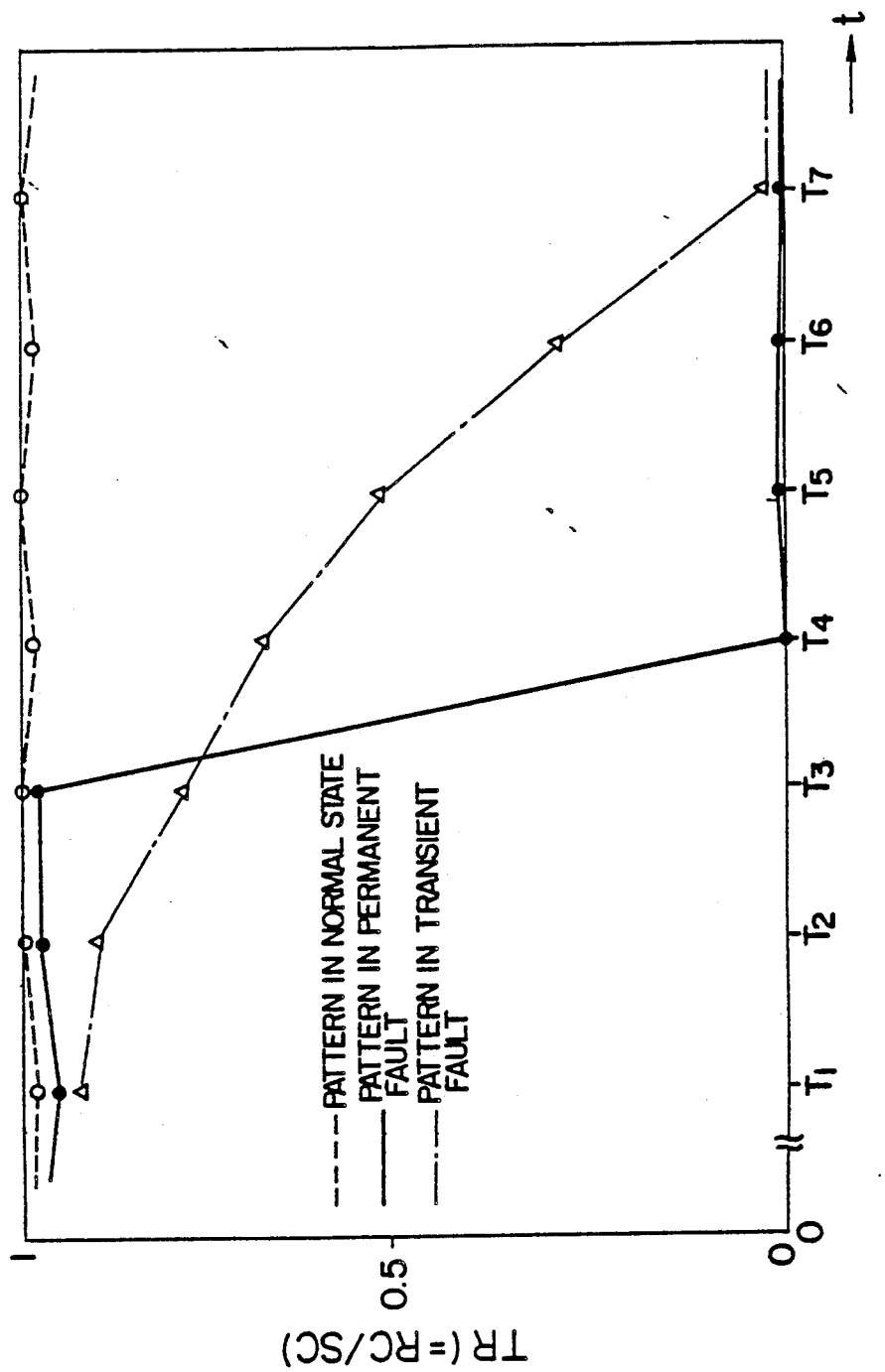

FAULT DIAGNOSTIC DISTRIBUTED PROCESSING METHOD AND SYSTEM

This is a continuation of application Ser. No. 938,442, filed Dec. 5, 1986, which is a continuation of application Ser. No. 569,903, filed Jan. 11, 1984, now abandoned.

BACKGROUND OF THE INVENTION

The present invention relates to a distributed processing system, and more particularly to a distributed processing system which includes mutually related subsystems and in which a fault in one subsystem may adversely affect other subsystems and in which a system-down condition is prevented and the degree or magnitude of the failure is diagnosed so as to improve system reliability.

FIG. 1 shows a comparing table for fault detection and diagnostics and recovery processing based on the result of diagnostic operations in a previously proposed distributed processing system and a recovery processing scheme according to the present invention. The ordinate in FIG. 1 represents an object item to be detected and diagnosed, and abscissa represents the object in need of recovery as a result of the detection and diagnosis.

In FIG. 1, an apparatus which detects a fault in its own subsystem and recovers from the fault in its own subsystem or faults in another subsystem based on the detection of the fault is called a self-diagnostic tester. In a self-diagnostic tester, each subsystem is configured on the presumption that "another subsystem perfectly detects and diagnoses all faults and recovers the faults based on the result of the diagnosis". Accordingly, if a subsystem fails to detect, diagnose or recover from the fault or makes a mistake, the other subsystems are influenced and a system-down condition is caused. An apparatus which detects and diagnoses a fault in another subsystem and recovers from the fault in the other subsystem based on the result of the diagnosis is called a centralized tester. A failure or a mistake in the detection, diagnosis or recovery in a centralized tester also directly affects other subsystems and causes the system-down condition.

In accordance with the present invention, on the other hand, an autonomous tester detects and diagnoses faults in other subsystems and protects its own subsystem from the faults of the other subsystems based on the result of the diagnosis. The functions of these three types of testers are illustrated in FIGS. 2 and 3.

A self-diagnostic tester includes the two types shown in FIGS. 2A and 2B. A tester in a subsystem 1 controls a fault recovery processing operation 21 in its own subsystem 1 or fault recovery processing operation 22 or 22' in other subsystems 2 or 3 based on the detection and diagnosis 11 or 12 of a fault in its own subsystem. If fault recovery processing operation is not correctly effected (symbol x in FIGS. 3A and 3B), the other subsystems 2 and 3 are affected (31, 32 or 32') and faults are caused therein.

In a centralized tester (FIG. 2D), the tester in the subsystem 1 detects and diagnoses (14, 14') faults in the other subsystems 2 and 3 and controls fault recovery processing operations 24 and 24' in the subsystems 2 and 3 based on the diagnosis. Accordingly, a fault in the subsystem 1 directly affects (34, 34') the other subsystems 2 and 3.

On the other hand, in an autonomous tester (FIG. 2C), the tester in the subsystem 1 detects and diagnoses (13, 13') faults in other subsystems 2 and 3 and controls a fault recovery processing operations 23 to protect its own subsystem from being affected by faults in other subsystems based on the diagnosis. Accordingly, a failure or a mistake in the detection, diagnosis or recovery processing operation for a fault in the subsystem 1 does not affect the other subsystems 2 and 3.

In the prior art distributed processing system, particularly in a system having a plurality of processors coupled through transmission lines, when a transient fault occurs, there is no means to determine whether it is indeed only a temporary fault or whether it is highly probable that the fault will become permanent.

SUMMARY OF THE INVENTION

It is an object of the present invention to provide a distributed processing system which resolves problems encountered in the prior art distributed processing system, and uses a self-diagnostic tester or a centralized tester, and which prevents a system-down condition and diagnoses the nature of a fault, while providing high reliability.

The above object of the present invention is achieved by a distributed processing system including a plurality of interconnected subsystems of equal level, in which each subsystem diagnoses faults in other subsystems and protects its own subsystem based on the diagnosis of the faults in the other subsystems. In a system having a plurality of processors coupled through a transmission line, a transmission control unit includes means for calculating the feedback rate of a signal sent out to the transmission line and means for storing the feedback rate calculated by the calculation means, whereby the degree or magnitude of the of fault on the transmission line is stored.

BRIEF DESCRIPTION OF THE DRAWINGS

The present invention will be apparent from the following detailed description taken in conjunction with the accompanying drawings, in which:

FIG. 1 illustrates classes of functions of various testers;

FIGS. 2A-2D and 3A-3D diagramatically illustrate functions of various testers;

FIGS. 6A-6G, and 7A and 7B show operations in the embodiment;

FIGS. 11, and 12 show structures of NCP and a host, respectively;

FIG. 14 is a graph illustrating fault patterns;

DESCRIPTION OF THE PREFERRED EMBODIMENTS

In the following embodiments, the present invention is applied to a loop transmission system.

First Embodiment

Figure 3A:
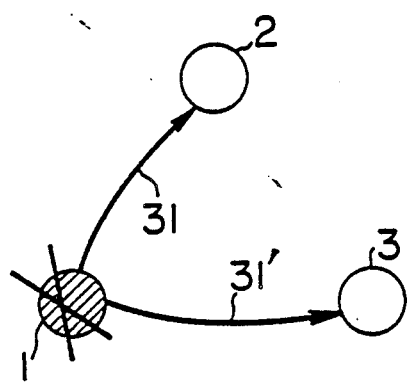
Figure 3B:
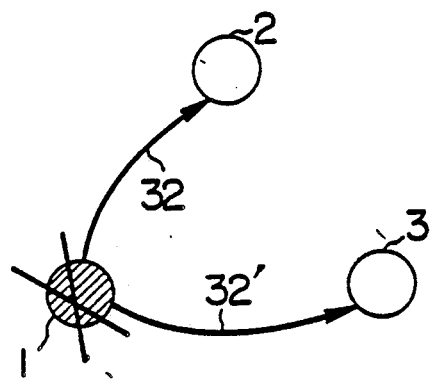
Figure 3C:
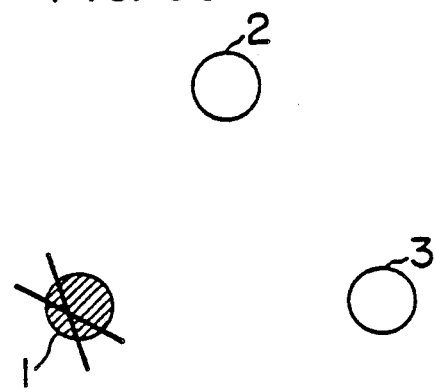
Figure 3D:
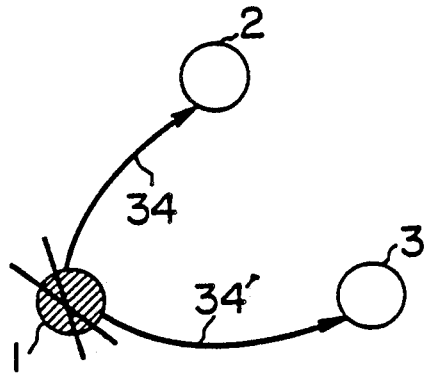
Figure 4:
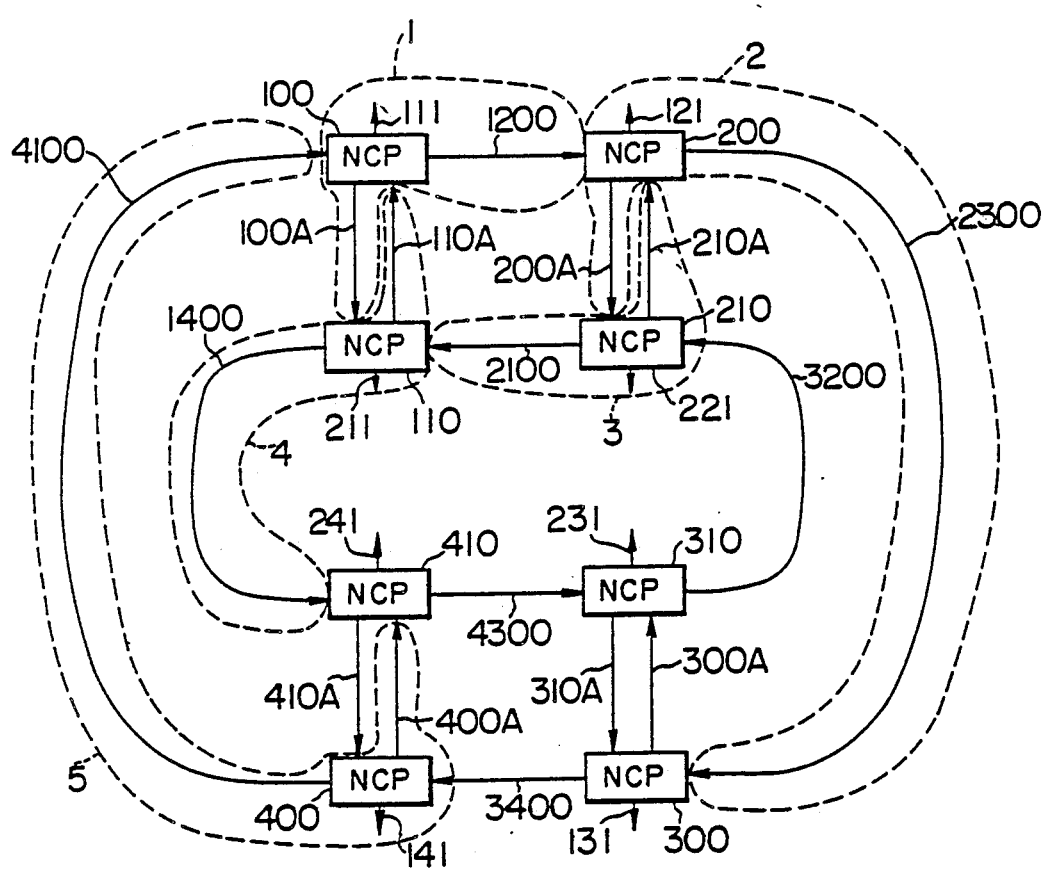
FIGS. 4 and 5 show a configuration of one embodiment of the present invention.

FIG. 4 shows the overall configuration of a distributed processing system in accordance with a first embodiment of the present invention. The present system comprises a plurality of paired network control processors (NCPs) arranged along dual loop transmission lines having opposite transmission directions (clockwise for the outer loop and counterclockwise for the inner loop). The paired network control processors 100 and 110, and 200 and 210 . . . are interconnected by bypass routes 100A, 110A; and 200A, 210A; . . . . Broken lines show areas of subsystems. For example, a subsystem 1 comprises the network control processor 100, a loop transmission line 1200 and the bypass route 100A, and a subsystem 2 comprises the network control processor 200, a loop transmission line 2300 and the bypass route 200A. The subsystem 1 is connected to only the subsystems 2, 4 and 5.

Figure 5:
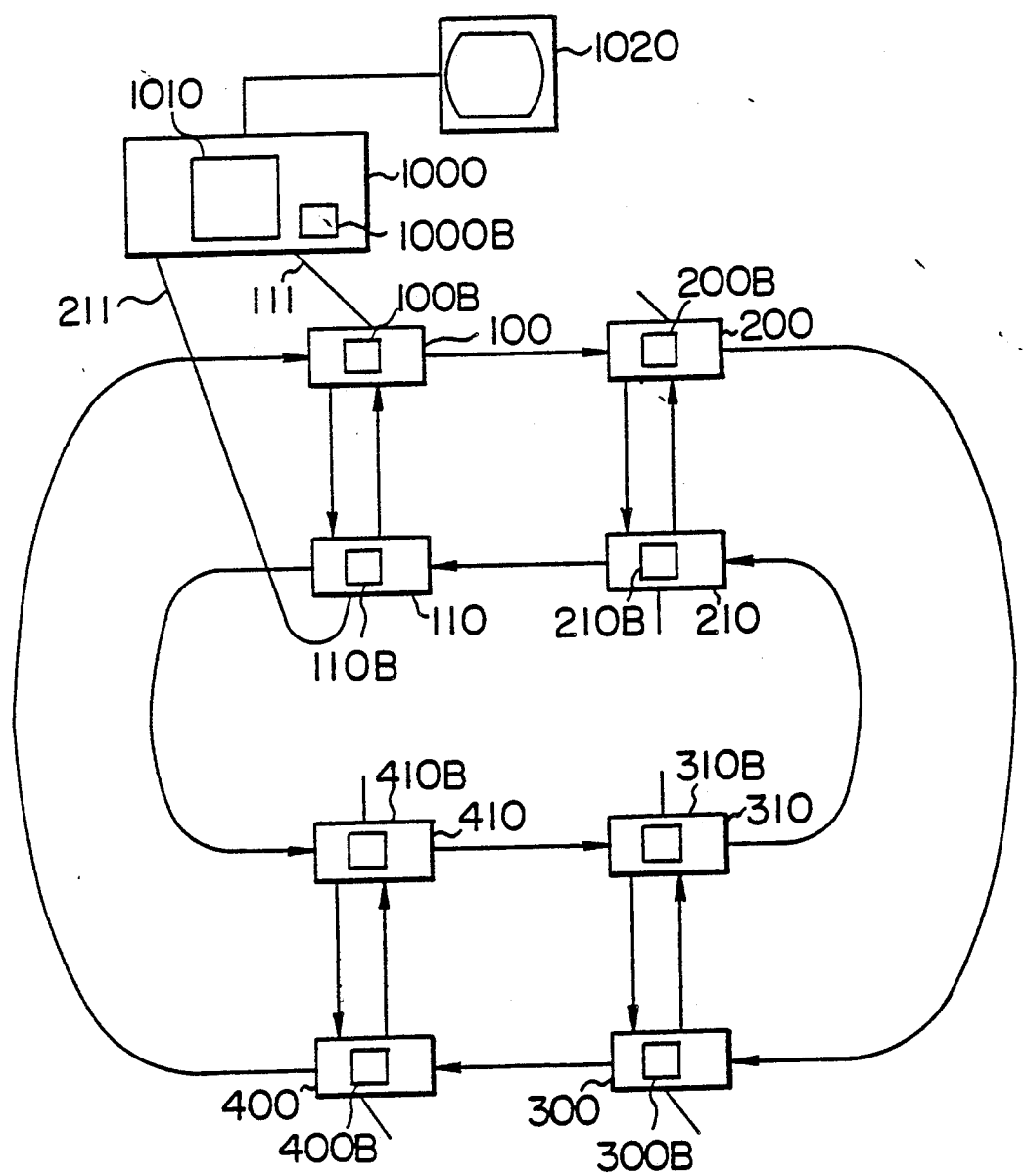

FIG. 5 shows details of the subsystem 1. A processor (host) 1000 is connected to the paired network control processors 100 and 110 through paired host transmission lines 111 and 211. The network control processors 100 and 110 and the processor 1000 contain built-in testers (BIT) 100B, 110B and 1000B, respectively. The BIT performs detection, diagnosis and recovery from faults of another subsystem among the functions of the network control processor. The processor 1000 also contains an external tester (EXT) 1010 to identify a fault location in the system. As will be described later, the EXT 1010 supplies fault location information to a display 1020 for presentation to service personnel. While not shown, the other subsystems 2, 3, . . . are also constructed identically to subsystem 1.

The operations of the testers BIT 100B, 110B and 1000B and the EXT 1010 will now explained in detail with reference to FIGS. 6A–6G, 7 and 8. In the following description, it is assumed that network control processors (NCP's) 400 and 410 are down.

It is assumed that the NCP 200 sends out a message 201 on the transmission line (loop) 2300. If the message is not returned to the sending source NCP 200 within a predetermined time period $T_1$, the NCP 200 retransmits the same message for confirmation. If the number of times of retransmission without return reaches a predetermined number $N_1$, the BIT 200B determines that a fault has occured on the transmission line (see FIG. 6A). Then, the BIT 200B sends out a minor loop check signal 202 to check if the message can be transmitted to the NCP 300 of the adjacent subsystem. When the BIT 300B of the NCP 300 receives the minor loop check signal 202 from the transmission line 2300, it determines that a fault has occured somewhere on the transmission line and sends the minor loop check signal 202 to the paired NCP 310 and also sends out a minor loop check signal 302 to the transmission line 3400.

When the NCP 310 receives the minor loop check signal 202 from the bypass route 300A, it sends out the minor loop check signal 202 to the loop 3200. When the BIT 210B of the NCP 210 receives the minor loop check signal 202 from the loop 3200, it transmits the minor loop check signal 202 to the paired NCP 200. In this manner, when the minor loop check signal 202 is returned to the sending source NCP 200, the BIT 200B determines that it can transmit the message to the adjacent NCP 300 and sends out the message to the loop 2300.

On the other hand, the BIT 200B informs the BIT 210B of the NCP 210 that the fault may have occurred on the inner loop. Thus, the BIT 210B sends out the minor loop check signal 212 to the loop 2100 as the BIT 200B did. When the BIT of the NCP receives the minor loop check signal, it checks the minor loop in the same manner as described above. Since it was assumed in the present example that the NCP 400 and 410 are down, the minor loop check signal is not returned to the BITs 300B and 110B.

Figure 6A:
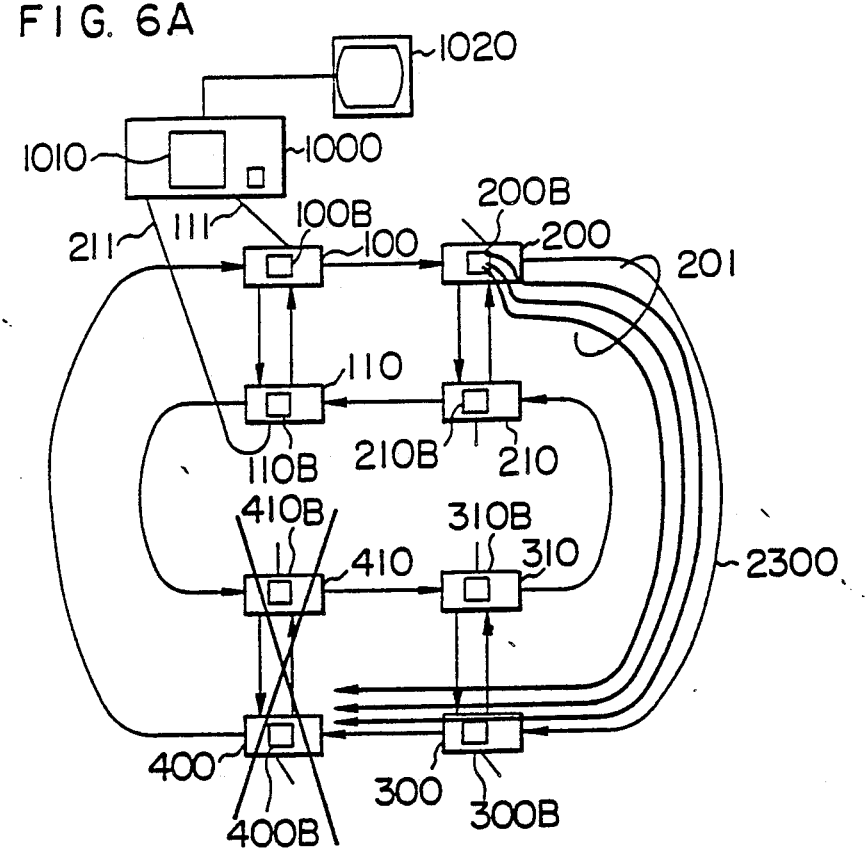
Figure 6B:
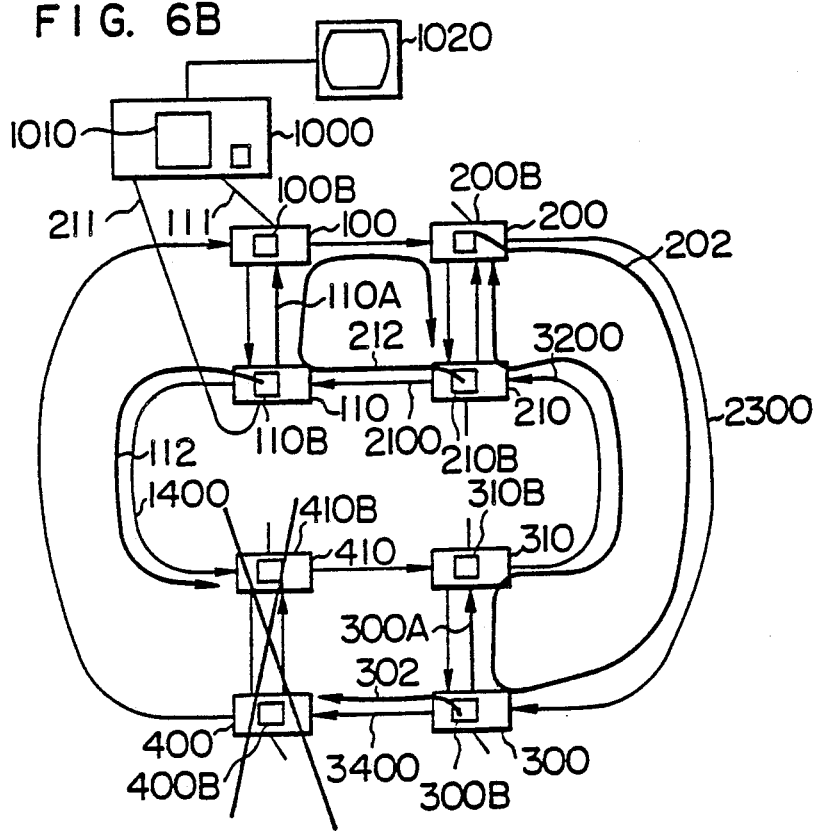
Figure 6C:
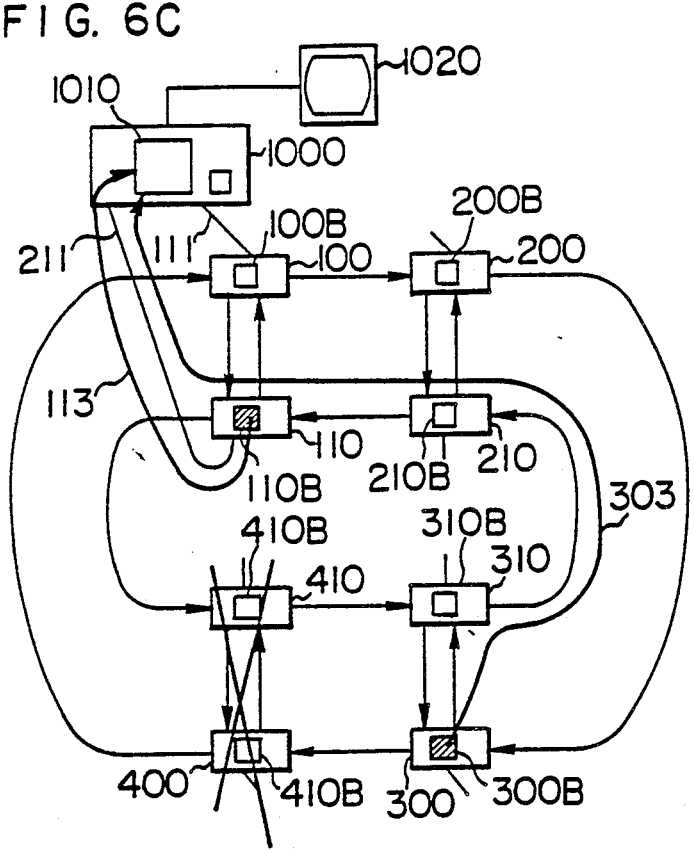
Figure 6D:
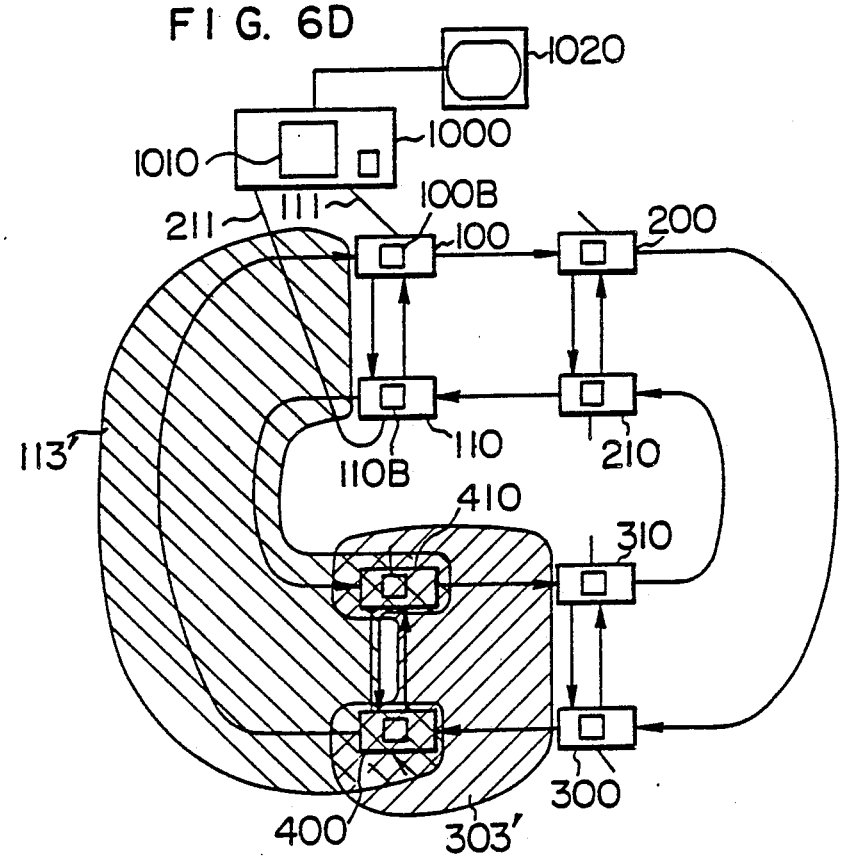
Figure 6E:
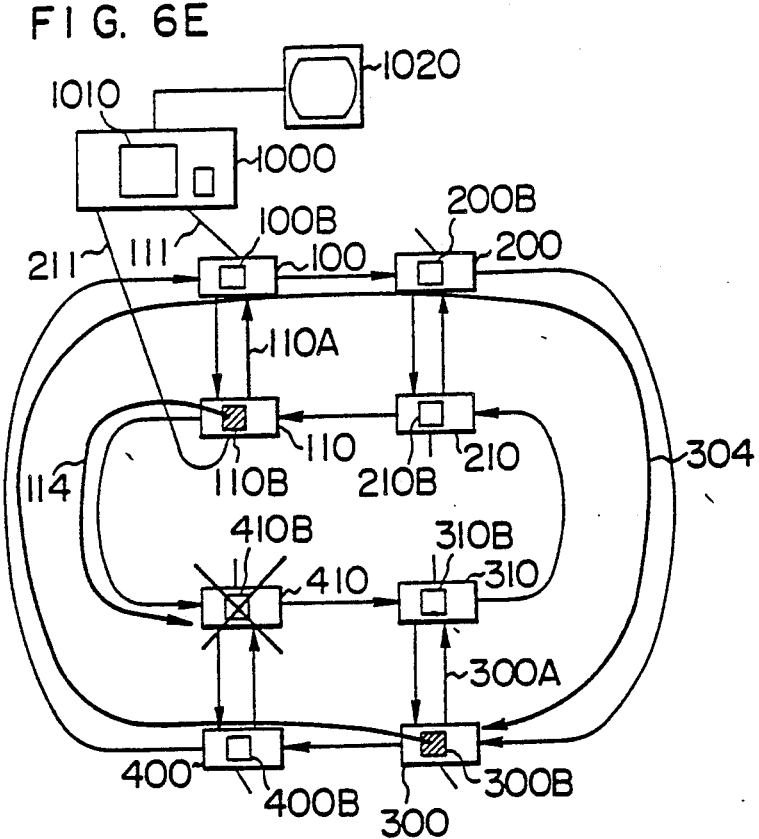
Figure 6F:
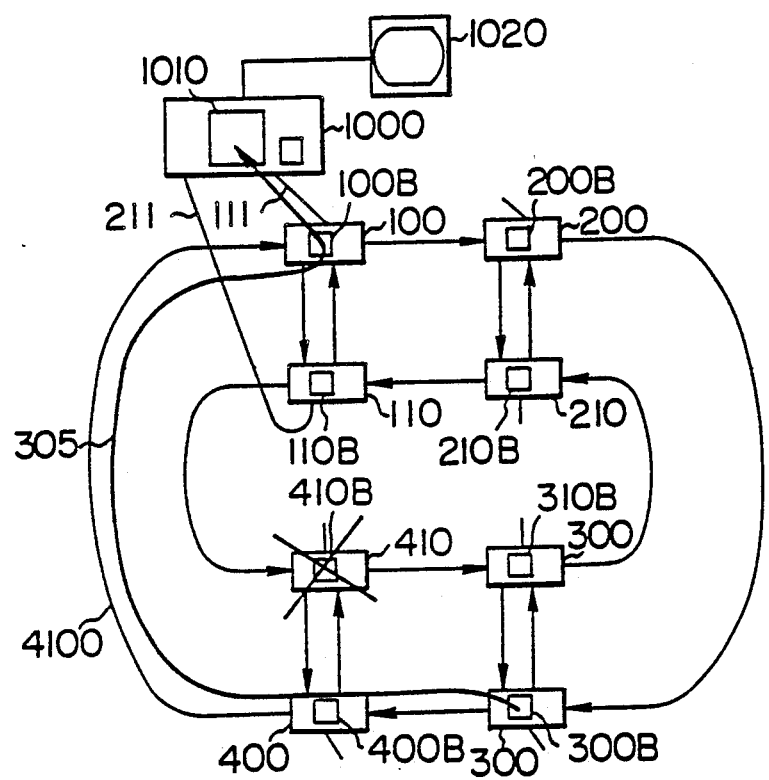
Figure 7A:
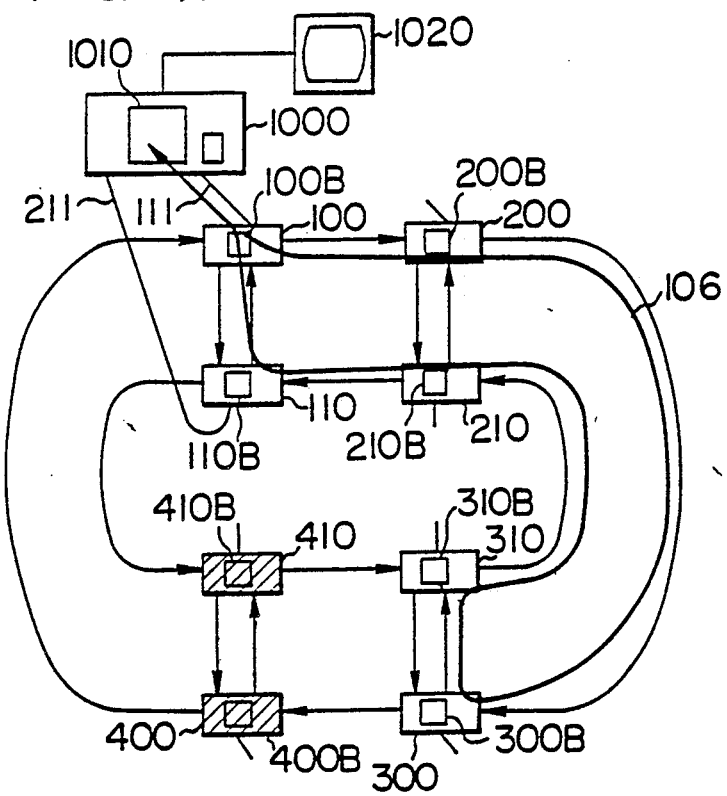
Figure 7B:
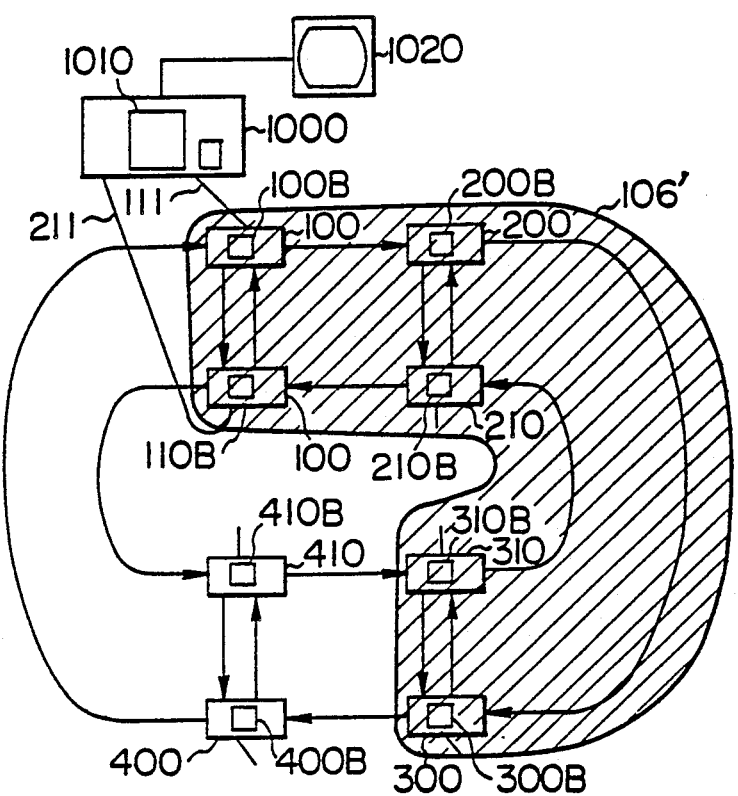

As a result, the BIT 300B forms a bypass route 300A and the BIT 110B constitutes the bypass route 110A and they do not send out the received messages to the loops 3400 and 1400, respectively, but send out the messages only to the bypass routes 300A and 110A, respectively (see FIG. 6B).

The BIT's 300B and 110B which formed the bypass routes send out bypass route formation broadcast signals 303 and 113, respectively. When NCP 100 or NCP 110 connected to EXT 1010 receives the bypass route formation broadcast signal 303 or 113, it transmits the signal 303 or 113 to the processor 1000 (see FIG. 6C).

The EXT 1010 of the processor 1000 diagnoses that a fault location area 113' (hatched area in FIG. 6D) based on the bypass route formation broadcast signal 113 and a fault location area 303 (right hatched area in FIG. 6D) based on the bypass route formation broadcast signal 303. The EXT 1010 combines the results of diagnoses and determines that the fault location is somewhere in the areas 113' and 303' and displays it on the display 1020.

The BIT's 300B and 110B which formed the bypass routes alternately and cyclically send out minor loop check signals 302 and 112 and major loop check signals 304 and 114 to check if the fault has been removed. Since the major loop check signal 304 is not bypassed by any NCP, if the major loop check signal 304 circulates through the loop and returns to the sending source, the BIT 300B determines that the fault on the loop has been removed and releases its own bypass route 300A. When the minor loop check signal (302 or 112) sent out by the BIT 300B or BIT 110B returns to the sending source BIT, that sending source BIT releases its own bypass route (see FIG. 6E).

After the BIT 300B has released the bypass route, it sends out a bypass route release broadcast signal 305. When the NCP 100 connected to the EXT 1010 receives the bypass route release broadcast signal 305, it transmits the signal 305 to the EXT 1010 (see FIG. 6F).

The EXT 1010 cancels the bypass route broadcast signal 303 from the BIT 300B based on the bypass route release broadcast signal 305 for the diagnosis results 113' and 303', and it also cancels the fault diagnosis result on the loop 4100 to narrow the fault location range to an area 113" (see FIG. 6G).

Figure 8:
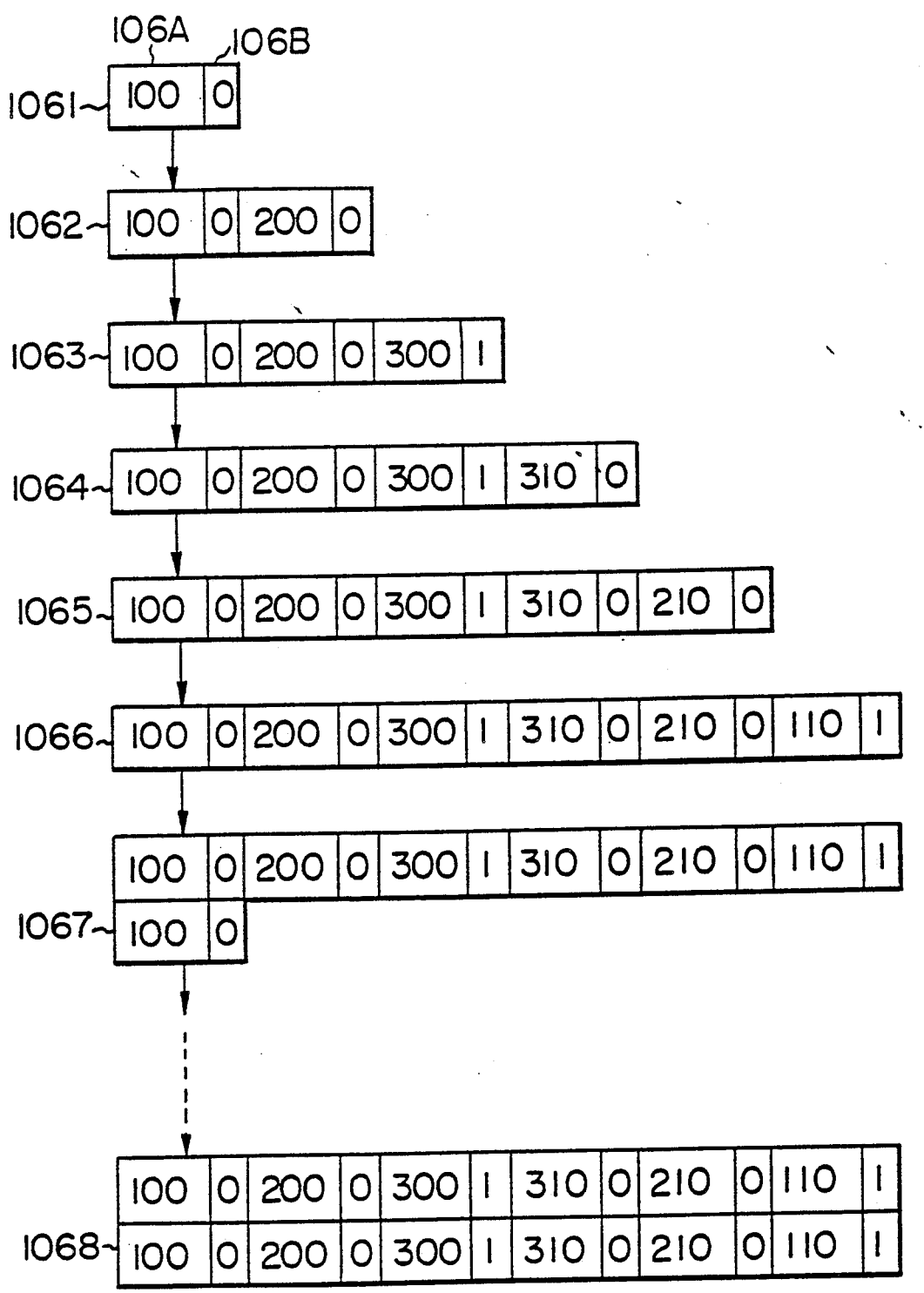
FIG. 8 shows an address sequence.

In order for the transmission to be correctly carried out, it is essential that the addresses of the respective NCP's are never repeated two different NCPs. To this end, each BIT checks if any other NCP's have the same address when power is turned on. Assuming that when the NCP 100 is started, the NCP's 200, 300, 310, 210 and 110 have already been started (see FIG. 7A), the BIT 100B of the started NCP 100 sends out an address train 106 to be described later. The address train 106 is sequentially received by the respective NCP's and sent out after the registration of the address. After the address train 106 has been circulated twice on the transmission line, it is transferred to the EXT 1010 by the sending source BIT 100. A process of formation of the address train as it passes the respective NCP's is shown in FIG. 8. Each BIT registers the address 106A and sets a bypass flag 106B to "1" if the bypass route is being formed.

The BIT 100B receives the address train 106B after it has circulated twice on the transmission line, and if the addresses of the other subsystem appended to its own addresse 100 in the first run and the second run are not equal, it determines that there is an address conflict and stops further transmission. The NCP 100 connected to the EXT 1010 reads in the address train 106 and informs EXT 1010. The EXT 1010 checks the bypass flag and the address in the address train 106 and determines the configuration of the system as 106' (see FIG. 7B) and displays it on the display 1020.

When the transmission to the NCP 100 (or 110) is not permitted, the BIT in the processor switches the transmission direction to the paired NCP 110 (or 100).

While the present invention is applied to a loop transmission system in the above embodiment, the present invention is not limited thereto but it may be applied to other types of distributed processing system such as a line or a matrix distributed processing system.

For details of the operation of the above embodiment, reference may be made to U.S. Pat. No. 4,380,061 "Loop Transmission System" and Japanese Patent Laid-Open Publication No. 200951/82.

Second embodiment

In the first embodiment described above, there is a problem that it is not possible to determine whether the transient fault detected is becoming a permanent fault or not and determine the degree of the fault. This will now be explained in detail.

Figure 9:
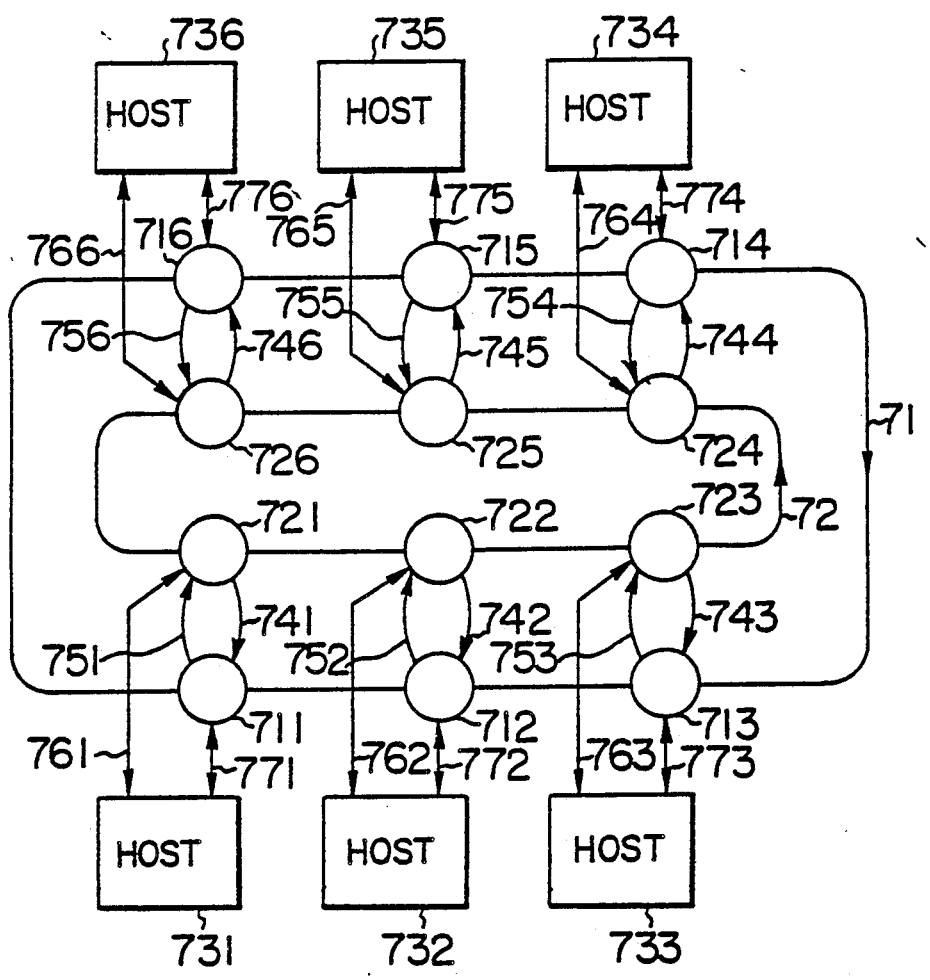
FIGS. 9 and 10 show an overall system of a second embodiment.

FIG. 9 shows an overall configuration of a loop transmission system. Numerals 71 and 72 denote loop transmission lines for transmitting information in opposite directions with respect to each other, and network control processors (NCP's) 711-716 and 721-726 are arranged in the loop transmission lines 71 and 72. The paired NCP's are interconnected by bypass routes 741-746 and 751-756. Processors (HOST's) 731-736 are connected to the paired NCP's through bilateral transmission lines 761-766 and 771-776.

Figure 10:
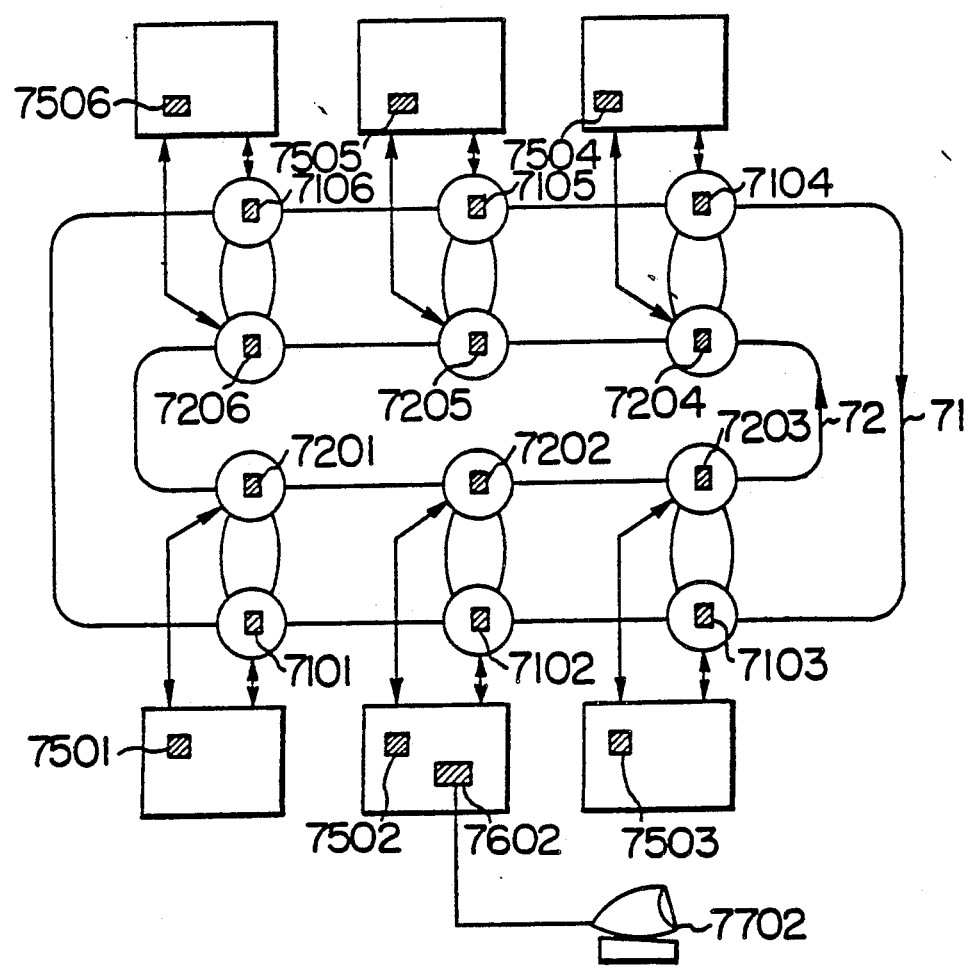

FIG. 10 shows an arrangement of testers. The NCP's 711-716 and 721-726 and the HOST's 731-736 contain built-in testers (BIT's) 7101-7106, 7201-7206 and 7501-7506. As will be explained later, since each BIT detects, diagnoses and recovers from faults in other subsystems, the transmission is not interrupted but is continued even if a fault occurs in a subsystem.

Figure 11:
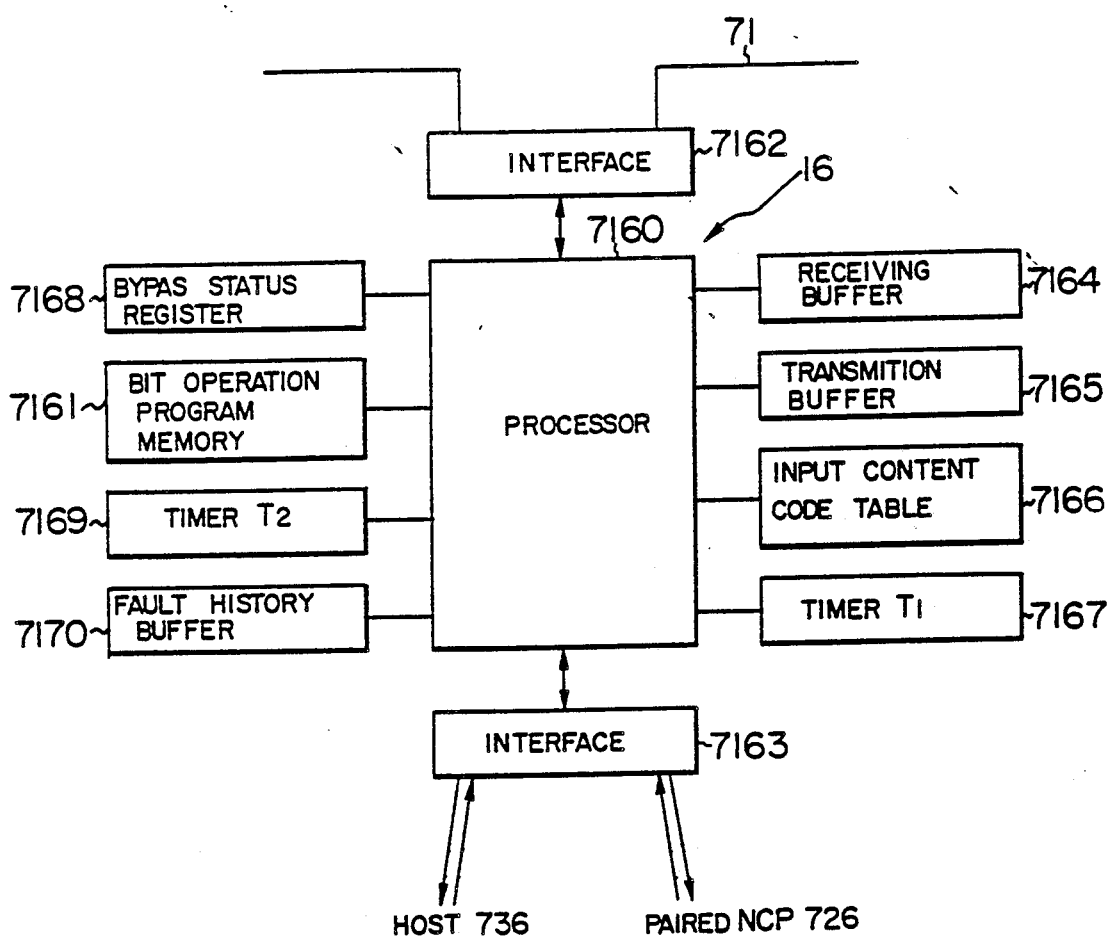

FIG. 11 shows the internal configuration of an NCP. While the NCP 716 is specifically shown, the other NCP's have the same configuration.

The NCP 716 comprises a processor 7160, an interface 7162 to the loop transmission line 71, an interface 7163 to the HOST 736 and the paired NCP 726, a receiving buffer 7164 for storing a message received from the loop transmission line 71 and the paired NCP 726, a transmission buffer 7165 for storing a message received from the HOST 736, an input content code table 7166 for storing the content code of a message to be read in by the NCP 716, a timer $T_1$ 7167 for monitoring a fault in the transmission, a bypass status register 7168 for detecting the bypass status of its own unit, a timer $T_2$ 7169 for periodically checking the time variation of a transient fault and a fault history buffer 7170 for storing the history of the fault status. An operation program of the BIT is stored in a memory 7161.

FIG. 12 shows the internal configuration of the HOST. While the HOST 732 is specifically shown, the other HOST's have the same structure except for the external testers and the displays to be described later.

The HOST 732 comprises a processor 7320, an interface 7321 to the NCP's 712 and 722, a receiving buffer 7322 a transmission buffer 7323, and timers $T_1$ and $T_2$, 7330 and 7331 having the same functions as those described above, flags 7324 and 7325 for indicating permission or non-permission of transmission to the NCP's 712 and 722, a memory 7326 for storing a BIT operation program and a buffer 7327 for storing a result of the BIT operation.

An external tester EXT 7602 for locating a fault in the system is provided in the HOST 732. The EXT 7602 outputs the fault location to the display 7702 to provide this information to service personnel. The operation program of the EXT 7602 is stored in the memory 7328 and the buffer 7329 stores the result of the operation.

A fault prediction diagnosis operation for a transient fault caused by a noise on the transmission line will be explained with reference to FIGS. 13A to 13D.

Figure 13A:
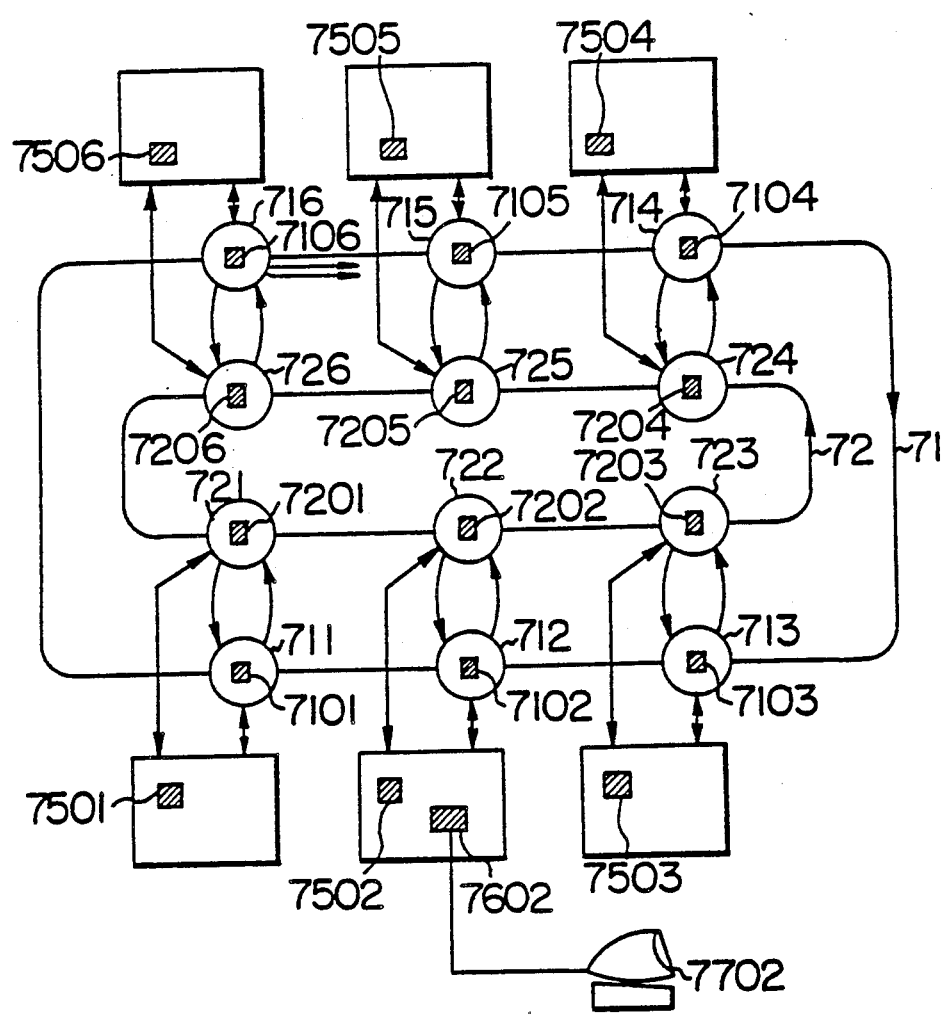
FIGS. 13A-13D show operations.

FIG. 13A shows the operation when a transient fault has occurred on the loop transmission line 71 between the NCP's 714 and 715. When the NCP 716 transmits a message on the loop transmission line 71, the transmitted message is not returned even after a predetermined time period $T_1$ and hence the NCP 716 retransmits the same message. If the message does not circulate because of the transient fault after a predetermined number $N_1$ of times of the retransmission, the BIT 7106 of the NCP 716 determines that a fault exists on the loop transmission line 71.

Figure 13B:
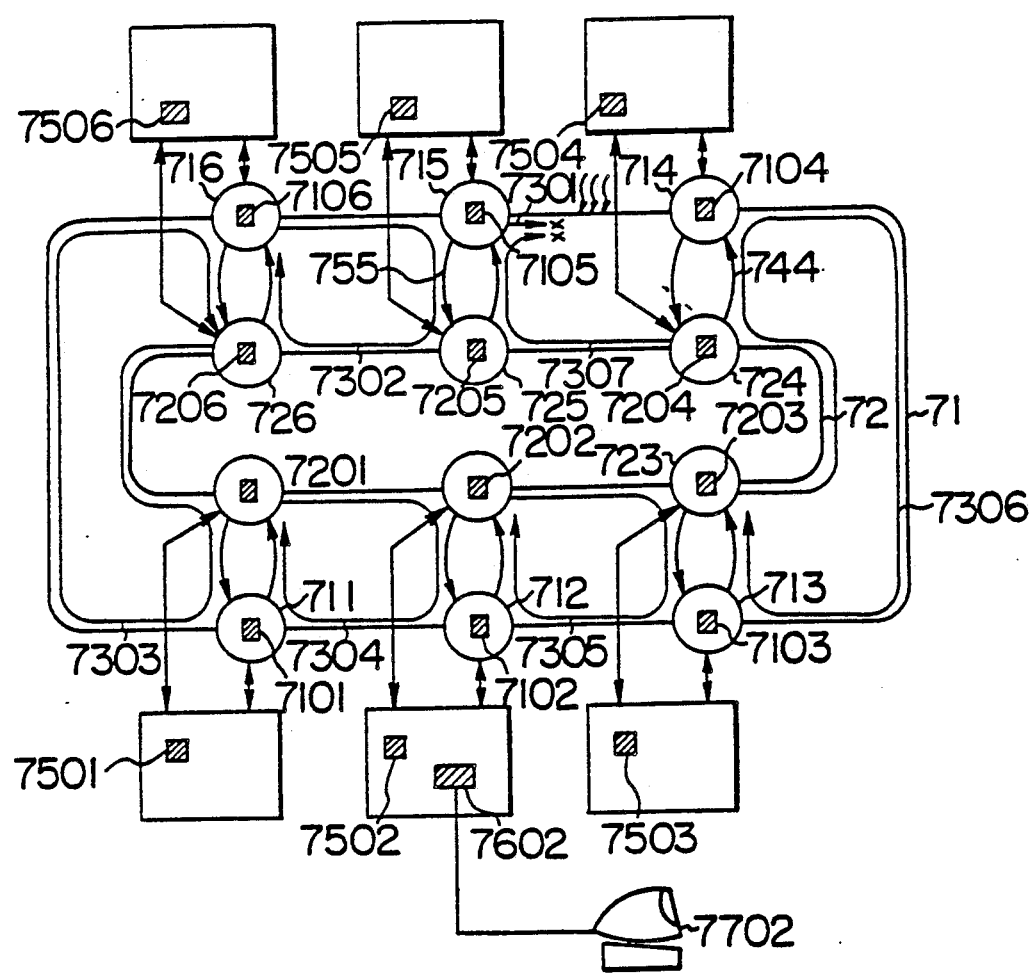
Figure 13C:
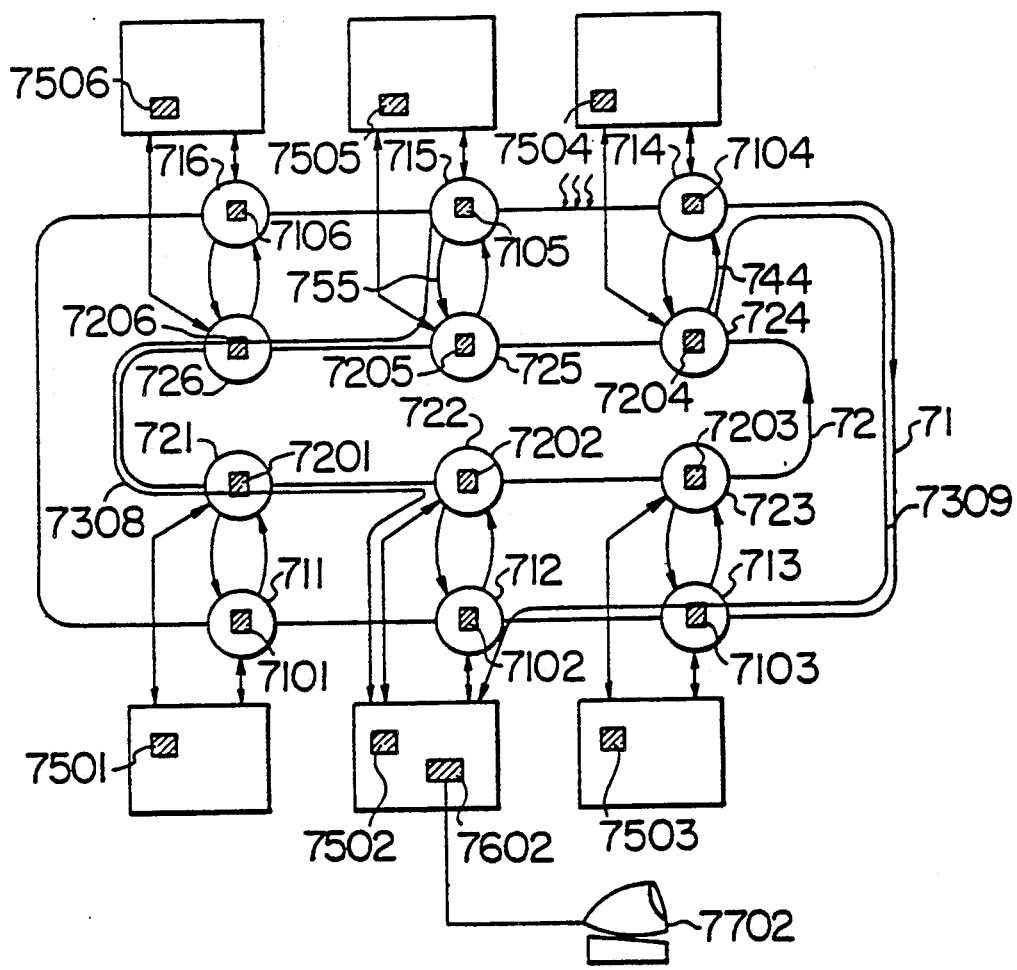
Figure 13D:
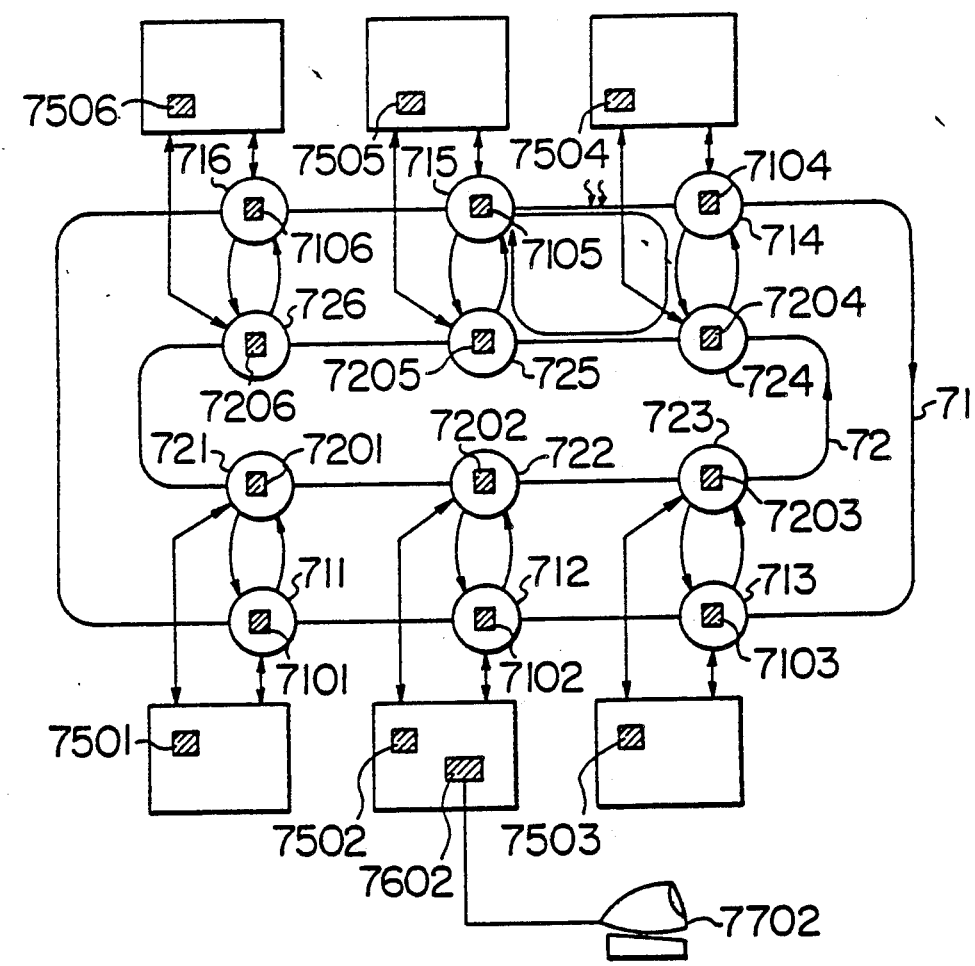

The BIT 7106 then sends out a minor loop check signal 7302 to check if it can transmit the message to the adjacent NCP 715 as shown in FIG. 13B. When the BIT 7105 of the NCP 715 receives the minor loop check signal 7302 from the loop transmission line 71, it transmits the received minor loop check signal 7302 to the paired NCP 725 over the bypass route 755 and also sends out a minor loop check signal 7301. When the BIT 7205 of the NCP 725 receives the minor loop check signal 7302 from the bypass route 755, it sends out the minor loop check signal 7302 to the loop transmission line 72.

When the BIT 7206 receives the minor loop check signal 7302 from the loop transmission line 72, it transmits the minor loop check signal 7302 to the paired NCP 716. If the minor loop check signal 7302 circulates and returns to the sending source NCP 716, the BIT 7106 can transmit the message to the adjacent NCP 715 and determines that there is no fault and subsequently sends out the message to the loop transmission line 71.

It is assumed that the minor loop check signal 7301 sent out from the BIT 7105 does not return because of the transient fault in the loop transmission line. In this case, the BIT 7105 forms bypass route 755 and does not subsequently send out the received message to the loop transmission line 71 but sends it out only to the bypass route 755. On the other hand, the BIT 7106 informs the BIT 7206 that there may exist a fault on the loop transmission line 72 and the BIT 7206 sends out a minor loop check signal 7303 as the BIT 7106 did.

The BIT's 7201, 7202, 7203 and 7204 sequentially check the minor loop in the same manner. Assuming that the minor loop check signal 7307 does not return to the BIT 7204 because of a transient fault, BIT 7204 forms bypass route 744 as shown in FIG. 13B and does not subsequently send out the received message to the loop transmission line 72 but sends it out only to the bypass route 744.

The BIT's 7105 and 7204 which formed the bypass routes send out bypass route formation broadcast signals 7308 and 7309. When the EXT 7602 receives the bypass route formation broadcast signals from the NCP's 712 and 722, it displays the fault location on the display 7702 (see FIG. 13C).

The BIT's 7105 and 7204 which formed the bypass routes alternately and cyclically send out a major loop check signal which is not bypassed by any NCP and the minor loop check signal in order to check if the fault has been recovered. If one of those signals returns, the BIT 7105 or 7204 determine that the previously detected fault has been eliminated nd releases the bypass route and subsequently sends out the received message to the loop transmission line.

Since the fault between the NCP's 715 and 714 is a transient fault, the minor loop check signal sent out by the BIT 7105 may return. In this case, in the diagnosis system in the prior art loop transmission system, the EXT 7602 determines that the system is normal (see FIG. 13D). Thus, although a transient fault still exists, correction of the transient fault may not be carried out.

In the second embodiment of the present invention, in order to resolve the above problem, the degree of the transient fault is stored, and when necessary, it is determined if the transient fault will become permanent based on a time variation of the degree of the fault, and if it is determined that the fault will become permanent, an indication is supplied to maintenance personnel. In this manner, a loop transmission system capable of predicting and diagnosing the fault is provided.

To this end, in accordance with a second embodiment, a dual loop transmission system having two loop transmission lines for transmitting data in opposite directions NCP's paired with the transmission lines and bypass routes for bilaterally transmitting the data between the paired NCP's, is provided with means for storing the degree of the fault detected on the transmission line.

The second embodiment will be explained in detail with reference to the drawings. In the present embodiment, the above object is achieved by adding a new function to the BIT described above. The new function uses the program operation of a microprocessor.

FIG. 14 shows a time variation of the degree of the fault on the transmission line. The ordinate represents a ratio TR (transient rate), which is obtained by dividing the number of times (RC) the minor loop check signal is fed back during predetermined time period by the number of times (SC) of transmission, as the degree of the fault, and the abscissa represents time. That is, $$TR = RC/SC$$

Symbols o indicate the normal state, symbols ● indicate a pattern of permanent fault and symbols △ indicate a pattern of transient faults. It is considered that the degree of the transient fault tends to gradually increase with time.

Figure 15:
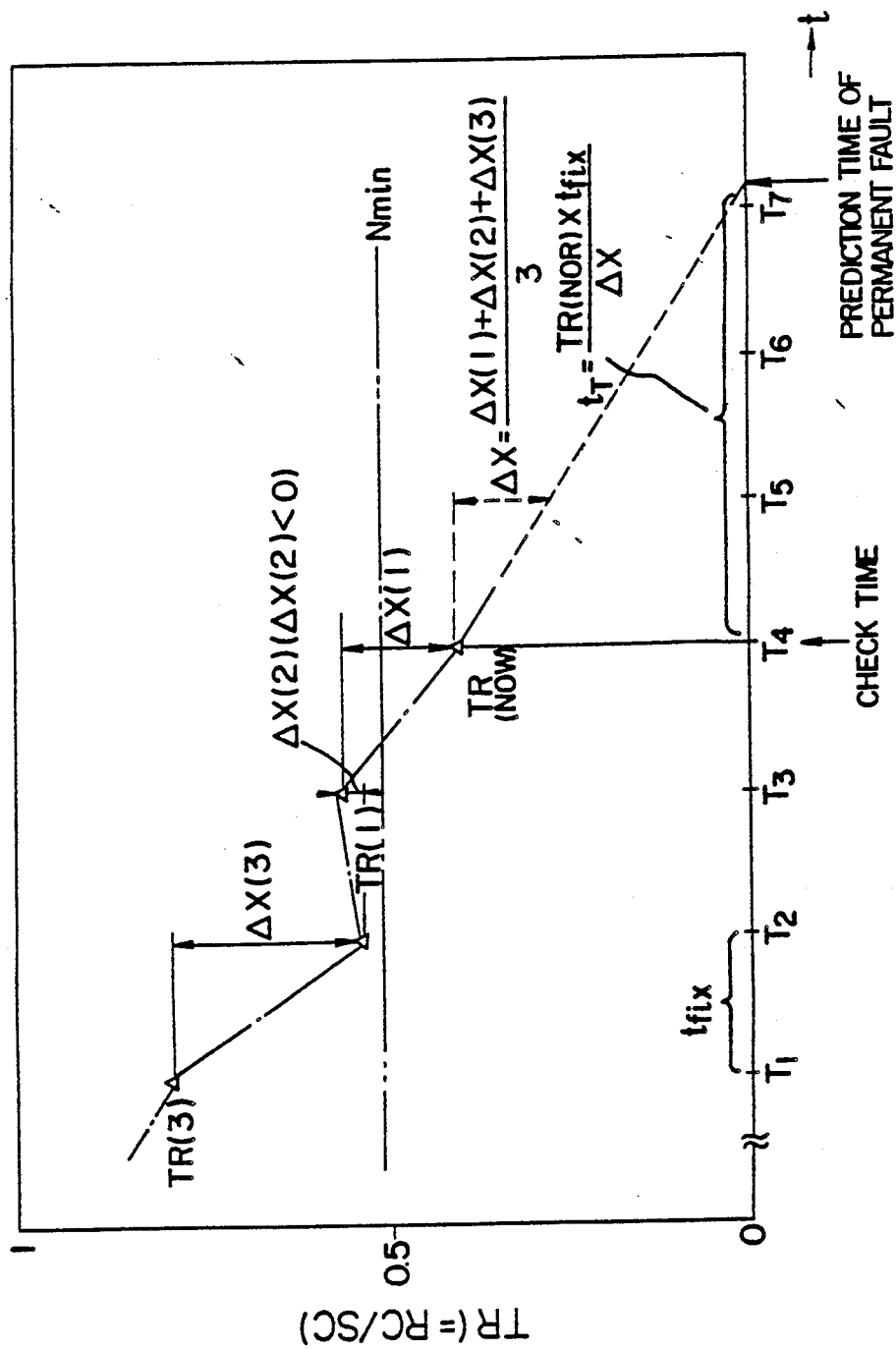
FIG. 15 graphically illustrates a principle of the present invention.

FIG. 15 illustrates graphically a principle of the present invention. The ordinate and abscissa represent the same contents as those in FIG. 14 respectively. The time axis scale of the abscissa is shown by check intervals (Ti), and the values RC and SC described above are cleared to zero at every check interval. A time (fault prediction time) $t_T$ at which fault is estimated to become permanent is calculated only when the TR value which indicates the degree of the fault is below a value Nmin (for example, Nmin = 0.5) which indicates that the fault clearly exists on the transmission line.

If the degree of the fault TR (NOW) is below the $N_{min}$ at a time $T_4$ shown in FIG. 15, differences between the degrees of fault in adjacent generations $\Delta X(1)$, $\Delta X(2)$ and $\Delta X(3)$ are calculated based on the degrees of fault in the three past generations TR(3), TR(2) and TR(1) and the degree of fault in the current generation TR(NOW), and an average thereof $\Delta X$ is calculated.

The prediction time $t_T$ can be represented as a relative time to the current time as follows.

$$t_T = TR(NOW) \times t_{fix}/\Delta X$$

H where $t_{fix}$ is the check interval.

Figure 16:
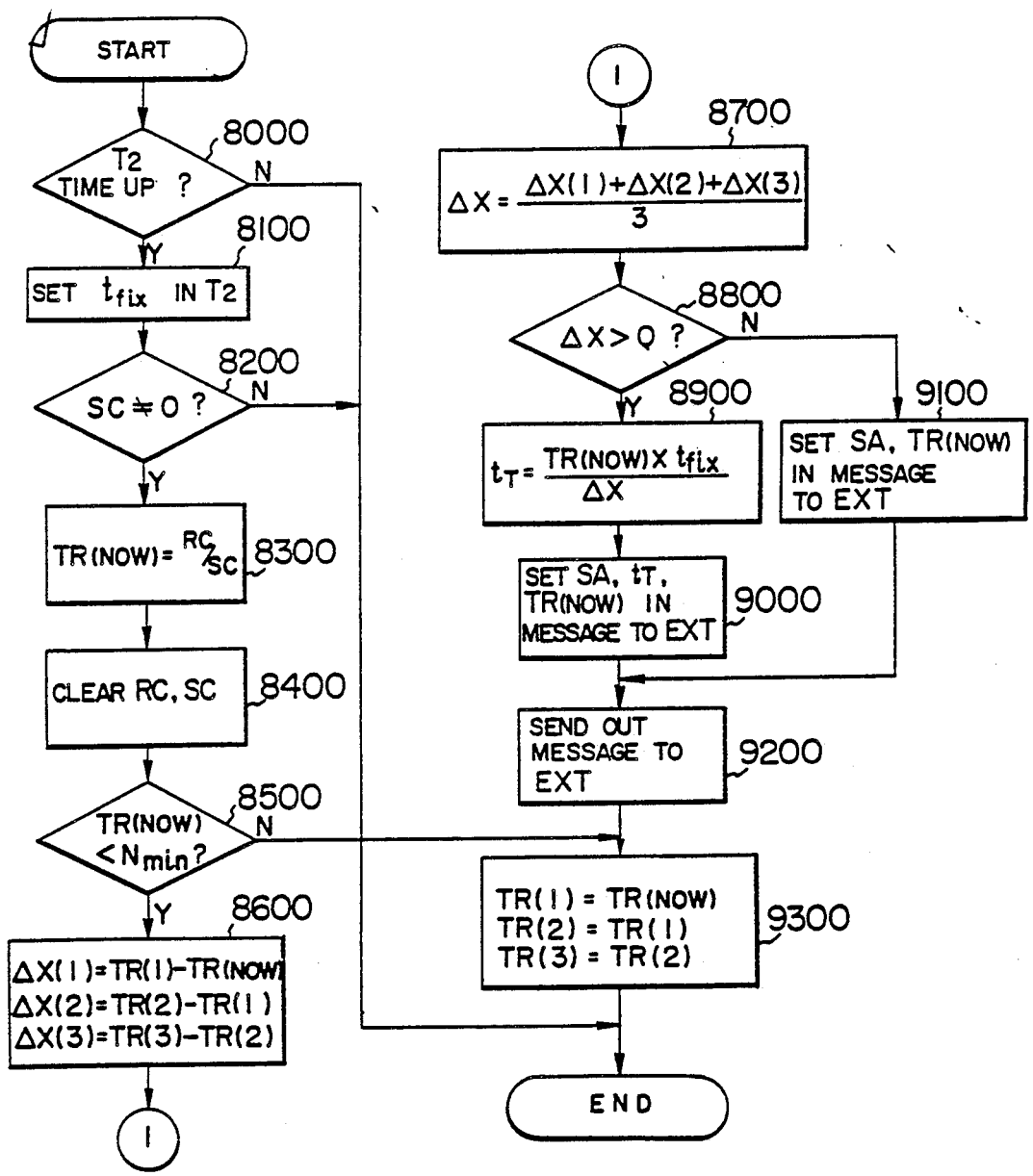
FIG. 16 is a processing flow chart of a BIT which is a main portion of the embodiment of the present invention.

The operation of the BIT in the NCP will be now explained by a processing flow chart shown in FIG. 16. Since all BIT's in the subsystems have the same algorithm, only the BIT 7106 of the NCP 716 is explained.

The BIT 7106 is operated cyclically and checks if the timer $T_2$ times out (8000). The check interval $t_{fix}$ has been set in the timer $T_2$ at the time of the previous check, and the content is decremented as the time elapses. When the timer $T_2$ times out, the next check is started. If the timer has not timed out, the check is not carried out.

When the timer $T_2$ times out, a check interval t is newly set in the timer $T_2$ (8100). It is checked if the SC is zero or not (8200). If the SC is zero, no operation is carried out, and if the SC is not zero, the current degree of fault TR (NOW) is calculated by the following equation.

$$TR(NOW) = RC/SC$$

The values RS and SC are then initialized (8400) and it is checked if the current degree of the fault TR(NOW) is below the reference $N_{min}$ (8500). If the current degree of fault TR(NOW) is not below $N_{min}$, the history of the degree of the fault is updated (9300), and if it is below $N_{min}$, a three-generation history of the degree of the fault is read out from the fault history buffer and the following calculations are performed (8600).

$$\Delta X(1) = TR(1) - TR(NOW)$$

$$\Delta X(2) = TR(2) - TR(1)$$

$$\Delta X(3) = TR(3) - TR(2)$$

An average $\Delta X$ of $\Delta X(1)$, $\Delta X(2)$ and $\Delta X(3)$ is calculated (8700). The sign of the average $\Delta X$ is examined, and if $\Delta X > 0$, it is determined that the degree of fault of the transient fault grows with time, and if $\Delta X \leq 0$, it is determined that the degree of fault does not grow (8800). When $\Delta X > 0$, the prediction time $t_T$ at which the current transient fault will become permanent is calculated by the following equation.

$$t_T = TR(NOW) \times t_{fix}/\Delta X$$

A message indicative of the result of the calculation for the EXT 7602 is prepared, and its NCP address (SA)

the time (relative time to the current time) $t_T$ at which the transient fault will become permanent and the current degree of the fault TR(NOW) are set in the data field of the message (9000), and the data is transmitted to the EXT.

When the degree of the transient fault does not grow ($\Delta X \leq 0$), a message to the EXT 7602 is prepared, and its NCP address (SA) and the current degree of the fault TR(NOW) are set in a data field of the message (9100), and the data is sent out to the EXT.

In any case, after the data has been sent out, the past history of the degree of the fault is updated (9300).

When the EXT 7602 receives the data, it displays the data on the display 7702. From this displayed data, service personnel can determine whether the fault is transient, the degree of the fault and the time at which the transient fault will become permanent so that the transient is effectively diagnosed.

While the operation of the BIT in one NCP of the second embodiment has been described above, the BIT's of the other subsystems operate in the same manner except the BIT in the HOST which checks the acceptance or non-acceptance of the transmission to the two NCP's instead of the minor loop to detect a transient fault.

In accordance with the second embodiment of the present invention, a dual loop transmission system having two loop transmission lines for transmitting data in opposite directions, paired NCP's on the transmission lines and bypass routes for transmitting data bilaterally between paired NCP's, is provided with means for storing the degree of the fault on the transmission lines. In one mode, the amount stored in memory is read out as required to output the time variation of the degree of the fault, in another mode, the possibility of a the transient fault being permanent is predicted, and in still another mode, the time at which the transient fault will become permanent is predicted.

As described hereinabove, in accordance with the present invention, there is provided a distributed processing system having a plurality of interconnected subsystems of equal level, in which each subsystem has diagnoses faults in the other subsystems and protects its own subsystem based on the diagnosis of the faults of the-other subsystems. Accordingly, a system-down condition in the distributed processing system is prevented and the reliability of the system is improved. In the second embodiment, the means for storing the degree of the fault on the transmission line is provided. Accordingly, when a transient fault occurs, the time variation of the degree of the transient fault and the change of the transient fault to a permanent fault can be indicated to improve the maintainability. Thus a loop transmission system in which fault can be readily prediction-diagnosed is provided.

I claim:

1. A method for processing data in a distributed processing system having a plurality of subsystems interconnected through at least one transmission path, said method comprising the steps of:
    sending, in each subsystem, a diagnosing signal for diagnosing a fault on a transmission route including at least one other subsystem and said transmission path;
    receiving, in each subsystem, a signal relating to said diagnosing signal from a transmission route;
    detecting the presence of a fault based on the signal relating to said diagnosing signal received in each subsystem;
    suppressing, in each subsystem, signal transmission to said transmission route which contains said fault upon detection of the fault;
    sending, in each subsystem, a signal representing the fault to said transmission path; and
    determining, in at least one subsystem, a fault location based on said fault representing signal.

2. A method for processing data in a distributed processing system having a plurality of subsystems interconnected through at least one transmission path, said method comprising the steps of:
    sending, in at least one subsystem, an address train when a power is supplied to said system; and
    receiving, in other subsystems, said address train;
    in each subsystem receiving said address train, sending to said transmission path said address train including information relating to the address of the receiving subsystem; and
    receiving said address train in at least one subsystem, and recognizing the address construction in said system by means of the received address train.

3. A method for processing data according to claim 2, wherein said step of recognizing includes a step of detecting duplication of an address in said subsystem.

4. A method for processing data according to claim 2, wherein said address train is circulated twice on the transmission path.

5. A method for processing data according to claim 3, wherein said address train is circulated twice on the transmission path.

6. A method for processing data in a distributed processing system having a plurality of subsystems interconnected through at least one transmission path, said method comprising the steps of:
    sending, in each subsystem, a signal for diagnosing a fault on a transmission route including at least one other subsystem and said transmission path;
    receiving, in each subsystem, a signal related to said diagnosing signal from a transmission route;
    detecting a fault based on the signal relating to said diagnosing signal received in each subsystem;
    suppressing, in each subsystem, signal transmission to said transmission route containing said fault upon detection of the fault;
    sending, in each subsystem, a signal for detecting recovery of the fault to said transmission route after detection of the fault;
    receiving, in each subsystem, a signal relating to a recovery detecting signal from said transmission path;
    detecting the recovery of the fault based on the signal relating to the recovery detecting signal received in each subsystem; and
    sending, in each subsystem, a signal representing said recovery of the fault to said transmission path upon detection of the recovery.

7. A method for processing data according to claim 6, which further comprises a step of determining, in at least one subsystem, a recovery location based on said recovery representing signal.

8. A method for processing data according to one of claims 6 or 10, which further comprises a step of reinstating the signal transmission on said transmission route containing said fault upon detection of the fault recovery.

9. A method for processing data in a distributed processing system having a plurality of subsystems interconnected through at least one transmission path, said method comprising the steps of:

sending, in each subsystem, a signal for diagnosing a fault on a transmission route including at least one other subsystem and said transmission path;

receiving, in each subsystem, a signal relating to said diagnosing signal from said transmission route;

detecting a fault based on the signal relating to said diagnosing signal received in each subsystem;

sending, in each subsystem, a signal representing the fault to said transmission path; and determining, in at least one subsystem, a fault location based on said fault representing signal.

10. A method for processing data in a distributed processing system having a plurality of subsystems interconnected through at least one transmission path, said method comprising the steps of:

sending, in each subsystem, a signal for detecting recovery of a fault on a transmission route including at least one other subsystem and said transmission path;

receiving, in each subsystem, a signal relating to said recovery detecting signal from said transmission route;

detecting the recovery of the fault based on the signal relating to the recovery detecting signal received in each subsystem;

sending, in each subsystem, a signal representing said recovery of the fault to said transmission route upon detection of the recovery; and determining, in at least one subsystem, a recovery location based on said recovery representing signal.

11. A method for processing data in a distributed processing system having a plurality of subsystems interconnected through at least one transmission path, said method comprising the steps of:

sending, in each subsystem, a signal for diagnosing a fault on a transmission route including other at least one subsystem and said transmission path;

receiving, in each subsystem, a signal relating to said diagnosing signal from said transmission route;

detecting a fault based on the signal relating to said diagnosing signal received in each subsystem;

storing, in each subsystem, a history of fault detection; and generating, in each subsystem, a signal for controlling signal transmission to said transmission route based on the stored history of fault detection.

12. A distributed processing system having a plurality of subsystems interconnected through at least one transmission path, comprising:

means in each subsystem for sending a diagnosing signal for diagnosing a fault on a transmission route including at least one another subsystem and said transmission path;

means in each subsystem for receiving a signal relating to said diagnosing signal from a transmission route;

means for detecting the presence of a fault based on the signal relating to said diagnosing signal received in each subsystem;

means in each subsystem for suppressing signal transmission to said transmission route which contains said fault upon detection of the fault;

means in each subsystem for sending a signal representing the fault to said transmission path; and means in at least one subsystem for determining a fault location based on said fault representing signal.

13. A distributed processing system having a plurality of subsystems interconnected through at least one transmission path, comprising:

means in at least one subsystem for sending an address train on said transmission path when power is supplied to said system; and means in other subsystems for receiving said address train;

means in each subsystem receiving said address train for sending to said transmission path said address train including information relating to the address of the receiving subsystem; and means for receiving said address train in at least one subsystem and for recognizing the address construction in said system by means of the received address train.

14. A distributed processing system according to claim 13, wherein said means for receiving said address train in at least one subsystem and for recognizing the address construction in said system operates to detect duplication of an address in said address train.

15. A distributed processing system according to claim 14, wherein said address train is circulated twice on the transmission path.

16. A distributed processing system according to claim 13, wherein said address train is circulated twice on the transmission path.

17. A distributed processing system having a plurality of subsystems interconnected through at least one transmission path, comprising:

means in each subsystem for sending a signal for diagnosing a fault on a transmission route including at least one other subsystem and said transmission path;

means in each subsystem for receiving a signal related to said diagnosing signal from a transmission route;

means for detecting a fault based on the signal relating to said diagnosing signal received in each subsystem;

means in each subsystem for controlling signal transmission to said transmission route containing said fault upon detection of the fault;

means in each subsystem for sending a signal for detecting recovery of the fault to said transmission route after detection of the fault;

means in each subsystem for receiving a signal relating to a recovery detecting signal from said transmission path;

means for detecting the recovery of the fault based on the signal relating to the recovery detecting signal received in each subsystem; and means in each subsystem for sending a signal representing said recovery of the fault to said transmission path upon detection of the recovery.

18. A distributed processing system according to claim 17, which further comprises means in at least one subsystem, for determining a recovery location based on said recovery representing signal.

19. A distributed processing system according to one of claims 17 or 21, which further comprises means for reinstating the signal transmission on said transmission route containing said fault upon detection of the fault recovery.

20. A distributed processing system having a plurality of subsystems interconnected through at least one transmission path, comprising:
- means in each subsystem for sending a signal for diagnosing a fault on a transmission route including at least one other subsystem and said transmission path;
- means in each subsystem for receiving a signal relating to said diagnosing signal from said transmission route;
- means for detecting a fault based on the signal relating to said diagnosing signal received in each subsystem;
- means in each subsystem for sending a signal representing the fault to said transmission path; and
- means in at least one subsystem for determining a fault location based on said fault representing signal.

21. A distributed processing system having a plurality of subsystems interconnected through at least one transmission path, comprising:
- means in each subsystem for sending a signal for detecting recovery of a fault on a transmission route including at least one other subsystem and said transmission path;
- means in each subsystem for receiving a signal relating to said recovery detecting signal from said transmission route;
- means for detecting the recovery of the fault based on the signal relating to the recovery detecting signal received in each subsystem;
- means in each subsystem for sending a signal representing said recovery of the fault to said transmission route upon detection of the recovery; and
- means in at least one subsystem for determining a recovery location based on said recovery representing signal.

22. A distributed processing system having a plurality of subsystems interconnected through at least one transmission path, comprising:
- means in each subsystem for sending a signal for diagnosing a fault on a transmission route including at least one other subsystem and said transmission path;
- means in each subsystem for receiving a signal relating to said diagnosing signal from said transmission route;
- means for detecting a fault based on the signal relating to said diagnosing signal received in each subsystem;
- means in each subsystem for storing a history of fault detection; and
- means in each subsystem for generating a signal for controlling signal transmission to said transmission route based on the stored history of fault detection.

* * * * *